(12) United States Patent
Utter et al.

(10) Patent No.: US 6,446,884 B1
(45) Date of Patent: Sep. 10, 2002

(54) HAND-HELD PLANT WATERING DEVICE FOR DIFFICULT TO REACH PLANTS

(76) Inventors: Mark A. Utter, 10624 W. Parkhill Dr., Littleton, CO (US) 80127; Jodi L. Utter, 10624 W. Parkhill Dr., Littleton, CO (US) 80127

( * ) Notice: Subject to any disclaimer, the term of this patent is extended or adjusted under 35 U.S.C. 154(b) by 0 days.

(21) Appl. No.: 09/377,533

(22) Filed: Aug. 19, 1999

(51) Int. Cl.[7] .............................................. B05B 15/06
(52) U.S. Cl. ..................... 239/532; 239/71; 239/302; 239/320; 239/329; 239/331; 239/375; 239/588; 222/386
(58) Field of Search ........................... 239/71, 74, 302, 239/320, 329, 331, 375, 532, DIG. 14, 588; 47/79, 48.5; 222/158, 320, 386

(56) References Cited

U.S. PATENT DOCUMENTS

| | | | | |
|---|---|---|---|---|
| 91,272 | A | * 6/1869 | Robira | 239/320 |
| 213,050 | A | * 3/1879 | Lewis | 239/320 |
| 238,388 | A | * 3/1881 | Heine | 239/288 |
| 636,598 | A | * 11/1899 | Weston et al. | 239/588 |
| 982,661 | A | * 1/1911 | Dickens | 239/320 X |
| 1,044,985 | A | * 11/1912 | Bullen | 239/320 X |
| 1,304,746 | A | * 5/1919 | Dingle | 239/74 X |
| 1,403,140 | A | * 1/1922 | Wiggins | 239/331 |
| 1,625,819 | A | * 4/1927 | McNeely | 222/320 X |
| 2,394,598 | A | * 2/1946 | Dunkelberger | 239/320 |
| 2,880,939 | A | * 4/1959 | Esmay | 239/320 X |
| 3,327,904 | A | * 6/1967 | Goda et al. | 222/386 X |
| 5,287,994 | A | * 2/1994 | Dempsey | 222/158 |
| 5,836,522 | A | * 11/1998 | Przystawik | 239/588 |
| 5,992,697 | A | * 11/1999 | James | 222/386 X |

* cited by examiner

*Primary Examiner*—Robin O. Evans
(74) *Attorney, Agent, or Firm*—Elwin H. Crabtree; Ramon L. Pizavvo; Donald W. Margolis

(57) ABSTRACT

A hand-held plant watering device used by a gardener or plant caregiver for watering difficult to reach plants. The watering device can be used both indoors and outdoors and is designed for holding and dispensing various quantities of water to each plant. The device includes broadly a flexible water tube attached at one end to a clear plastic water cylinder with a slidable plunger. The flexible water tube includes a first end having a removable defuser for spraying water onto a plant. A second end of the flexible water tube is attached to and is in fluid communication with a first end of the water cylinder. The water cylinder has a liquid measurement index along it's length for metering a desired amount of water from the cylinder. A second end of the water cylinder is used for receiving a first end of the slidable plunger. The first end of the plunger includes a piston with "O" ring therearound. The "O" ring prevents water from leaking outwardly from the sides of the piston and around an inner circumference of the water cylinder. A second end of the plunger includes a handle. The handle is used by the gardener for extending the plunger outwardly from the water cylinder when filling the cylinder with water and retracting the plunger inwardly into the water cylinder when discharging water outwardly from the defuser when watering the plant.

9 Claims, 1 Drawing Sheet

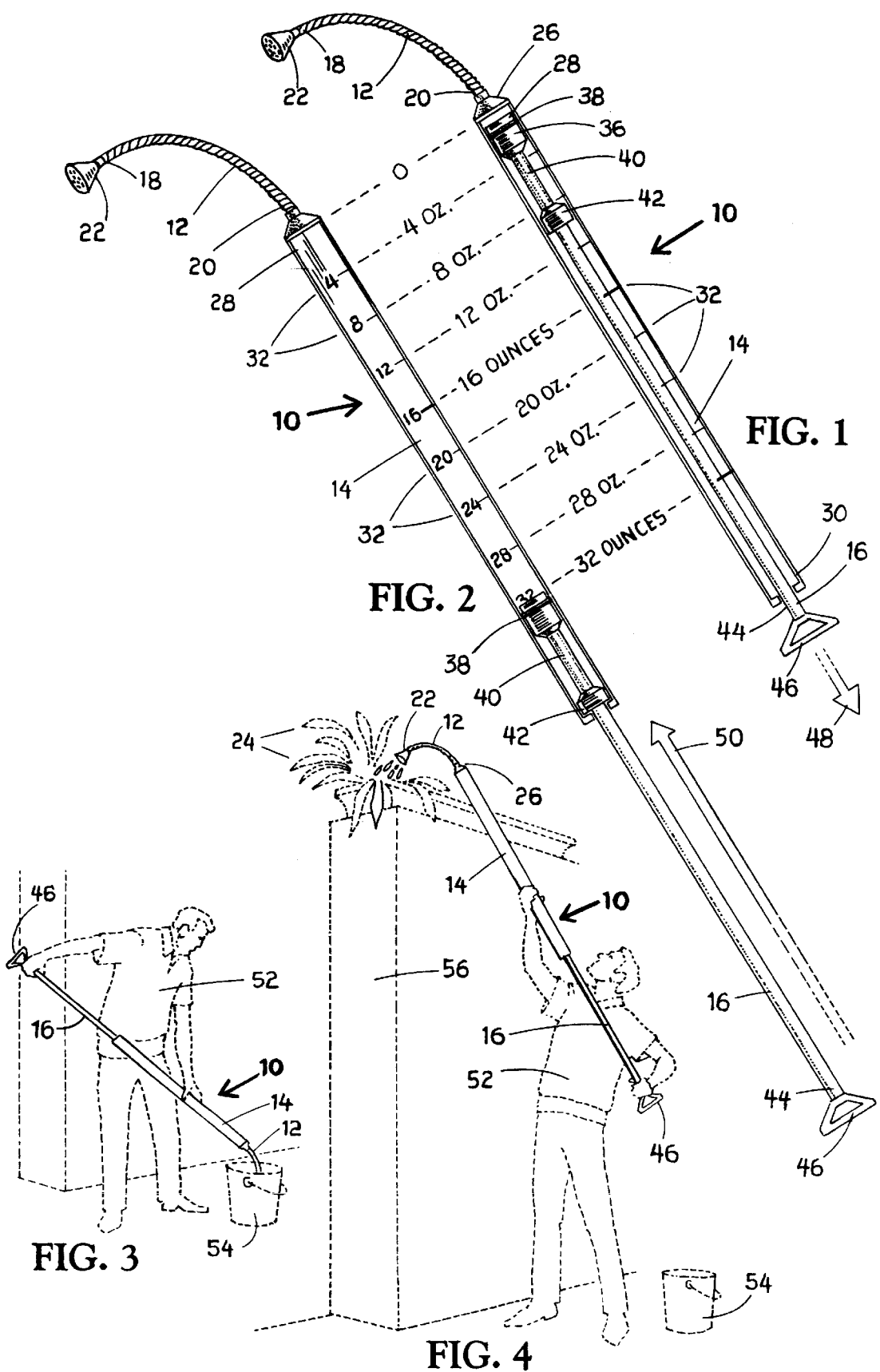

HAND-HELD PLANT WATERING DEVICE FOR DIFFICULT TO REACH PLANTS

BACKGROUND OF THE INVENTION (a) Field of the Invention

This invention relates to plant watering devices and more particularly, but not by way of limitation, to a hand-held watering device used for watering plants that are difficult to reach indoors and outdoors.

(b) Discussion of Prior Art

Heretofore, there have been many different types and styles of plant watering devices for watering indoor and outdoor plants and gardens. With the advent of larger homes in the United States having skylights, tall book cases and high mantels, potted plants are now quite often placed in hard to reach locations and therefore the plants are difficult to water on a regular basis.

In U.S. Pat. No. 4,524,944 to Sussman, a plant water device is described for metering water through a squeezable tube. The device includes a rotatable cam for controlling the amount of water volume through to tube to each plant. In U.S. Pat. No. 4,037,361 to Murphy et al., a plant watering tubular stick is illustrated for feeding a predetermined amount of water to the plant. The tubular stick is used for holding water and/or plant food and includes a decorative cap. U.S. Pat. Nos. 4,682,550 to Joy, 4,745,706 to Muza et al. and 4,829,708 to Gonzalez discloses different types of hand-held watering devices used for inserting into a ground surface and watering a plant.

None of the above mentioned patents disclose or teach the unique features, structure and advantages of the subject invention when used in watering difficult to reach plants.

SUMMARY OF THE INVENTION

In view of the foregoing, it is a primary object of the subject invention to provide hand-held plant watering device that is light weight and easy to use when watering difficult to reach plants. The watering device can be quickly filled with various amounts of water and can be used by gardeners, plant caregivers and others. The device is designed to have a reach of 5 to 6 feet and greater.

Yet another object of the invention is the watering device includes a flexible tube with diffuser which can be bent into a desired shape and angle for proper placement when watering a plant.

Still another object of the invention is the watering device has a water cylinder with a measurement index for discharging a desired amount of water to a selected plant.

Yet another object of the device is the water cylinder can be used for holding water or holding a water and plant food mixture.

The watering device includes broadly a flexible water tube attached at one end to a clear plastic water cylinder with a slidable plunger. The flexible water tube includes a first end having a removable defuser or spray head for spraying water onto a plant. A second end of the flexible water tube is attached to and is in fluid communication with a first end of the water cylinder. The water cylinder has a liquid measurement index along it's length for metering a desired amount of water from the cylinder. A second end of the water cylinder is used for receiving a first end of the slidable plunger. The first end of the plunger includes a piston with "O" ring therearound. The "O" ring prevents water from leaking outwardly from the sides of the piston and around an inner circumference of the water cylinder. A second end of the plunger includes a handle. The handle is used by the gardener for extending the plunger outwardly from the water cylinder when filling the cylinder with water and for retracting the plunger into the water cylinder when discharging water outwardly from the defuser when watering the plant.

These and other objects of the present invention will become apparent to those familiar with the plant water devices and plant feeders when reviewing the following detailed description, showing novel construction, combination, and elements as herein described, and more particularly defined by the claims, it being understood that changes in the embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments of the present invention according to the best modes presently devised for the practical application of the principles thereof, and in which:

FIG. 1 is a side view of the subject hand-held plant watering device illustrating the flexible water tube with the clear plastic water cylinder cut away to expose the slidable plunger in a retracted position inside the water cylinder.

FIG. 2 is another side view of the hand-held plant watering device with the water cylinder cut away and the slidable plunder in a fully extended position.

FIG. 3 is a perspective view of a plant caregiver, shown in dashed lines, using a water bucket to fill the water cylinder with water.

FIG. 4 is another perspective view of the plant caregiver using the subject invention and watering a difficult to reach plant on top of a mantel.

DESCRIPTION OF THE PREFERRED EMBODIMENTS

In FIG. 1, a side view of the subject hand-held plant watering device is illustrating having a general reference numeral 10. Broadly, the watering device 10 includes a flexible water tube 12, a water cylinder 14 and a slidable plunger 16. In this drawing, the water cylinder 14 is shown cut away to expose the slidable plunger 16 in a completely retracted position inside the water cylinder 14.

The flexible water tube 12 includes a first end 18 and a second end 20. The first end 18 is attached to a removable defuser 22 which is used for spraying water on a plant 24. The plant 24 is shown in dashed lines in FIG. 4. While the defuser 22 is shown in the drawings, it should be kept in mind various types of attachments and spray heads can be used equally well for discharging water out the first end 18 of the water tube 12. The second end 20 of the flexible water tube 12 is attached to an annular tube connector 26 which is used to connect the flexible tube 12 in fluid communication to a first end 28 of the water cylinder 14. The water tube 12 is typically 12 to 24 inches in length or greater along with having a diameter in a range of ⅜ to ½ inch or greater. The water tube 12 is designed to be positioned at various angles for proper positioning of the defuser 22 next to a difficult to reach plant to be watered.

The water cylinder 14 includes, in addition to the first end 28, a second end 30 which is used to receive the slidable plunger 16 therein. The water cylinder 14 has a diameter in a range of ¾ to 1 inch or greater and a length in a range of 24 to 36 inches or greater. The plunger 16 also has a length in a range of 24 to 36 inches or greater. It should be noted, that the overall length of the water tube 12, the water cylinder 14 and the slidable plunger 16 are important so that the user of the water device 10 will have a sufficient length, being in a range of 5 to 6 feet and greater, to reach out-of-the-way plants which heretofore where difficult, if not impossible, to provide proper adequate watering and care.

The water cylinder 14 also includes a liquid measurement index 32 along the length of the cylinder for metering a desired amount of water to each plant. The index 32, in FIGS. 1 and 2, is shown in measurements of from 0 to 32 ounces of water with increments shown every 4 ounces. Obviously, various units of measurement can be used in metering water from the cylinder 14 without departing from the spirit and scope of the invention. The index 32 is helpful, since certain plants may require 4 ounces of water every other day while other plants may require 8 ounces of water every other day, every three days, etc. The index 32 allows the operator of the water device 10 to apply the proper amount of water to each plant without over watering or under watering.

The water cylinder 14 may be made of clear plastic and like material for ease in viewing the filling and discharging of the water from the cylinder 14. Also, the water cylinder 14 can be used with a mixture of water and plant food for dispensing and spraying the mixture onto a plant.

The slidable plunger 16 includes a first end 34 with a piston 36 with an "O" ring 38 therearound. The "O" ring 38 prevents water from leaking outwardly from the sides of the piston 36 and around an inner circumference of the water cylinder 14. The plunder 16 also includes a piston rod 40 connected to the piston 36 and a plunger connector 42. A second end 44 of the plunger 16 includes a handle 46. The handle 46 is used for gripping the plunger 16 and sliding it inwardly in a retracted position as shown in FIG. 1 and sliding it outwardly in an extended position as shown in FIG. 2. In FIG. 1, an arrow 48 is shown for moving the plunger 16 outwardly when filling the water cylinder 14 with water. In FIG. 2, an arrow 50 is shown for moving the plunger 16 inwardly when discharging the water from the water cylinder 14 when watering plants.

In FIG. 2, another side view of the hand-held plant watering device 10 is shown. In this drawing, the water cylinder 14 is cut away and the slidable plunder 16 is shown in a fully extended position. In this position, for example, the water cylinder 14 is ready to be filled with up to 32 ounces of water for watering various hard to reach plants.

In FIG. 3, a perspective view of a gardener or a plant caregiver 52 is shown in dashed lines holding the subject watering device 10. In this drawing, the gardener 52 is shown using a water bucket 54 for filling the water cylinder 14 with water. Obviously, by removing the defuser 22 and holding the first end 18 of the flexible water tube 12 in the bucket 54, water is sucked into the cylinder 14. The water is drawn by extending the plunger 16 outwardly from the water cylinder 14, as indicated by arrow 48 shown in FIG. 1. Once the water cylinder 14 is filled, the watering device 10 is ready for watering plants.

In FIG. 4, another perspective view of the gardener 52 is shown using the subject invention and watering a difficult to reach plant 24 on top of a mantel 56. As mentioned above, the gardener 52 by moving the plunger 16 inwardly, as indicated by arrow 50 shown in FIG. 2, water is metered outwardly through the water cylinder 14, through the flexible water tube 12 and out the removable defuser 22.

While the invention has been shown, described and illustrated in detail with reference to the preferred embodiments and modifications thereof, it should be understood by those skilled in the art that equivalent changes in form and detail may be made therein without departing from the true spirit and scope of the invention as claimed, except as precluded by the prior art.

The embodiments of the invention for which an exclusive privilege and property right is claimed are defined as follows:

1. A hand-held plant watering device used for watering difficult to reach plants, the water device comprising:
  a flexible water tube having a first end and a second end, said flexible water tube having means for spraying water attached to the first end thereof, said water tube having a length in a range of 12 to 24 inches and a diameter in a range of ⅜ to ½ inches;
  a water cylinder having a first end and a second end, the first end of said water cylinder attached to the second end of said flexible water tube, said water cylinder adapted for receiving water therein, said water cylinder having a length in a range of 24 to 36 inches and a diameter in a range of ¾ to 1 inch;
  a liquid measurement index disposed along a length of said water cylinder for measuring a desired amount of water to be metered from the said water cylinder; and
  a slidable plunger having a first end and a second end, said slidable plunger slidably received in the second end of said water cylinder, said plunger adapted for discharging water from said water cylinder, said plunger having a length in a range of 24 to 36 inches.

2. The watering device as described in claim 1 wherein said means for spraying is a water defuser attached to the first end of said flexible water tube.

3. The watering device as described in claim 1 wherein the first end of said slidable plunger includes a piston with piston rod, said piston having an "O" ring therearound, said "O" ring preventing water from leaking outwardly from sides of said piston and around an inner circumference of said water cylinder.

4. The watering device as described in claim 1 wherein the second end of said slidable plunger includes a handle, said handle used for extending said plunger outwardly from said water cylinder when filling said cylinder with water and for retracting said plunger inwardly into said water cylinder when discharging water therefrom when watering plants.

5. A hand-held plant watering device used for watering difficult to reach plants, the water device comprising:
  a flexible water tube having a first end and a second end, said flexible water tube having means for spraying water attached to the first end thereof, said water tube having a length in a range of 12 to 24 inches and a diameter in a range of ⅜ to ½ inches;
  a water cylinder having a first end and a second end, the first end of said water cylinder attached to the second end of said flexible water tube, said water cylinder adapted for receiving water therein, said water cylinder having a length in a range of 24 to 36 inches and a diameter in a range of ¾ to 1 inch, said water cylinder adapted for receiving water in amounts in a range of 24 to 32 ounces and greater;
  a liquid measurement index disposed along a length of said water cylinder for measuring a desired amount of water from 0 to 32 ounces and greater to be metered from said water cylinder; and
  a slidable plunger having a first end and a second end, said slidable plunger slidably received in the second end of said water cylinder, said plunger adapted for discharging water from said water cylinder, said plunger having a length in a range of 24 to 36 inches.

6. The watering device as described in claim 5 wherein said means for spraying is a water defuser attached to the first end of said flexible water tube.

7. The watering device as described in claim 5 wherein the first end of said slidable plunger includes a piston with piston rod, said piston having an "O" ring therearound, said "O" ring preventing water from leaking outwardly from sides of said piston and around an inner circumference of said water cylinder.

8. The watering device as described in claim 5 wherein the second end of said slidable plunger includes a handle, said handle used for extending said plunger outwardly from said water cylinder when filling said cylinder with water and for retracting said plunger inwardly into said water cylinder when discharging water therefrom when watering plants.

9. A hand-held plant watering device used for watering difficult to reach plants, the water device comprising:

- a flexible water tube having a first end and a second end, said water tube having a length in a range of 12 to 24 inches and a diameter in a range of $3/8$ to $1/2$ inches;
- a water defuser attached to the first end of said flexible water tube;
- a water cylinder having a first end and a second end, the first end of said water cylinder attached to the second end of said flexible water tube, said water cylinder adapted for receiving water therein, said water cylinder having a length in a range of 24 to 36 inches and a diameter in a range of $3/4$ to 1 inch, said water cylinder adapted for receiving water in amounts in a range of 24 to 32 ounces and greater;
- a liquid measurement index disposed along a length of said water cylinder for measuring a desired amount of water from 0 to 32 ounces and greater to be metered from said water cylinder to be metered from the said water cylinder;
- a slidable plunger having a first end and a second end, said slidable plunger slidably received in the second end of said water cylinder, the first end of said slidable plunger having a piston with piston rod, said piston having an "O" ring therearound, said "O" ring preventing water from leaking outwardly from sides of said piston and around an inner circumference of said water cylinder, said plunger adapted for discharging water from said water cylinder, said plunger having a length in a range of 24 to 36 inches; and
- a handle mounted on the second end of said slidable plunger, said handle used for extending said plunger outwardly from said water cylinder when filling said cylinder with water and for retracting said plunger inwardly into said water cylinder when discharging water therefrom when watering plants.

* * * * *